US010037041B2

(12) United States Patent
Ratti et al.

(10) Patent No.: US 10,037,041 B2
(45) Date of Patent: Jul. 31, 2018

(54) SYSTEM AND APPARATUS FOR INTEGRATING MOBILE SENSOR PLATFORMS INTO AUTONOMOUS VEHICLE OPERATIONAL CONTROL

(71) Applicant: Bio-Cellular Design Aeronautics, Inc., Huntsville, AL (US)

(72) Inventors: Jayant Ratti, Atlanta, GA (US); Kamal M. Benjelloum, Huntsville, AL (US); Roderick Hynes, Huntsville, AL (US)

(73) Assignee: BIO CELLULAR DESIGN AERONAUTICS AFRICA SA, Casanearsbore (MA)

( * ) Notice: Subject to any disclaimer, the term of this patent is extended or adjusted under 35 U.S.C. 154(b) by 0 days.

(21) Appl. No.: 15/385,542

(22) Filed: Dec. 20, 2016

(65) Prior Publication Data

US 2018/0173247 A1    Jun. 21, 2018

(51) Int. Cl.
*G05D 1/12* (2006.01)
*G05D 1/10* (2006.01)
*G05D 1/00* (2006.01)
*G06F 17/12* (2006.01)
*G06F 17/16* (2006.01)
*B64C 39/02* (2006.01)
(Continued)

(52) U.S. Cl.
CPC .............. *G05D 1/12* (2013.01); *B64C 39/024* (2013.01); *B64D 47/08* (2013.01); *G05D 1/0088* (2013.01); *G05D 1/104* (2013.01); *G06F 17/12* (2013.01); *G06F 17/16* (2013.01); *G06K 9/0063* (2013.01)

(58) Field of Classification Search
CPC ........ G05D 1/12; G05D 1/0088; G05D 1/104; B64C 39/024; B64C 47/08; G06F 17/16; G06K 17/16; G06K 9/0063; H04N 7/181; G01S 17/026; H04W 4/02
USPC ............................................................ 701/3
See application file for complete search history.

(56) References Cited

U.S. PATENT DOCUMENTS 8,358,403 B1 * 1/2013 Smith .................. G01S 17/003
356/5.01
9,058,565 B2 * 6/2015 Zavesky ............ G06Q 30/0261
(Continued)

OTHER PUBLICATIONS

Segor et al., Mobile Ground Control Station for Local Surveillance, 2010, IEEE, p. 152-157 (Year: 2010).*
(Continued)

*Primary Examiner* — McDieunel Marc
(74) *Attorney, Agent, or Firm* — Leason Ellis LLP (57) ABSTRACT

The foregoing is directed, in one embodiment, to a system for optimizing the continuous monitoring of targets by a collection of mobile sensor platforms comprising a plurality of mobile sensor platforms equipped with a processor, at least one imaging device and a communication device, wherein in the processor of each of the mobile sensor platforms is configured, though code executing therein, to communicate with the other plurality of mobile sensor platforms in order to assign each member of the plurality to obtain image data of a member of a set of targets in response to the receipt of target selection data, and a remote computing device configured to receive imaging data from one or more of the plurality of the mobile sensors and generate a target selection data for transmission to the plurality of mobile sensor platforms.

8 Claims, 4 Drawing Sheets

(51) Int. Cl.
    *B64D 47/08*     (2006.01)
    *G06K 9/00*     (2006.01)

(56) References Cited

U.S. PATENT DOCUMENTS

| 9,446,858 B2* | 9/2016 | Hess | B64F 3/02 |
| 9,578,095 B2* | 2/2017 | Zavesky | G06Q 30/0261 |
| 9,611,038 B2* | 4/2017 | Dahlstrom | B64C 39/024 |
| 2017/0258005 A1* | 9/2017 | Cutter | A01C 21/005 |

OTHER PUBLICATIONS

Flammini et al., Railway Infrastructure monitoring by Drones, 2016, IEEE, p. 1-6 (Year: 2016).*

Boudjit et al., Detection and Implementation Autonomous Target Tracking with a Quadrontor AR Dron, 2015, IEEE, p. 1-8 (Year: 2015).*

Erden et al., Remote Sensors and Mobile Technologies for Precision Agricultural Data, 2015, IEEE, p. 1-4 (Year: 2015).*

* cited by examiner

SYSTEM AND APPARATUS FOR INTEGRATING MOBILE SENSOR PLATFORMS INTO AUTONOMOUS VEHICLE OPERATIONAL CONTROL

The present invention describes a system and method for ground and human sensors to provide input, updates and corrections to the tracking and navigational modules used by unmanned aerial vehicles (UAVs) such that the UAVs will provide more accurate estimates of the ground targets and items of interest.

BACKGROUND OF THE INVENTION

Troops and security personnel often jump in harm's way without look ahead and early-warning capabilities. UAVs are usually not smart enough to undertake vital operations autonomously but instead require the assistance of a team of pilots and operators. In the field, important information is presented better through the experience and judgement of trained officers, personnel and soldiers regardless of the tactical and strategic situation on the ground. UAVs to date present information on the map and target localization to the infantry/soldiers on the ground, however no support mechanism exists for troops to provide situational awareness back to the UAVs to make them fly smarter and improve their co-operative control with humans.

On the battlefield, there is no time for UAVs to be monitored and programmed repeatedly and dedicatedly. Thus, there exists a need for a UAVs operator interface to be seamless and effective while not compromising any of the control/decisions made by humans on the ground. In effect, users and UAVs should co-exist and complement each other and not be dependent on each other for their correct operation..

Currently, UAVs work together in collaborative networks to detect ground obstacles/targets and track movement/disturbances as an early-warning/look-ahead for soldiers and personnel on the ground. However, most of the collaborative schemas for UAVs don't address the problem of incorporating humans as a valuable sensor. Humans on the ground can provide valuable battlefield assessment as well, including providing estimates on ground activity where occlusions exist for UAVs, as well as being better equipped to provide location and likelihood estimates when humans are in direct line-of-sight of the object of interest. Furthermore, human input also recieves ground reconnaissance information from scouts and ground intelligence, which is not provided to the UAV network in the sky in time to make better assessments/prediction of ground activity Therefore, what is needed is a system and method that provides a collaborative scheme where multiple UAVs can be effectively controlled by ground personnel without jeopardizing their time commitments and on-field vigilance.

SUMMARY OF THE INVENTION

In accordance with one aspect that can be implemented in one or more embodiments, the present invention is directed to a computer implemented system and method for maximizing the number of targets monitored by a plurality of mobile sensor platforms distributed throughout an area. In one particular implementation, the method includes obtaining imaging data of a plurality of targets of interest within a defined geographic region using at least one sensor integral to at least one of the plurality of mobile sensor platforms, each mobile sensor platform equipped with a processor configurable by code executing therein.

This imaging data is transmitted to a secondary computing device configured to allow a user to select, using the secondary computing device, a subset of the targets of interest for additional imaging. The subset selection is transmitted back to at least one of the plurality of mobile sensor platforms for further processing and coordination. The mobile sensor platforms exchange data with one another such that each of the plurality of mobile sensor platforms is transmitted an updated instruction set to continuously image a specific member of the subset of targets such that the maximum number of targets is continuously imaged. In a particular implementation, the instruction set includes an updated navigational path and sensor instructions for each of the plurality of mobile sensor platforms such that each mobile platform maintains continuous imaging of the respective assigned target by altering its respective flight path, sensor orientation or a combination thereof.

In a further implementation of the system described, the instruction set configures a processor of the mobile sensor platform to alter at least one computer controlled movement control device to cause the mobile platform to follow the updated navigational path.

These and other aspects, features and advantages of the present invention can be further appreciated from the following discussion of certain more particular embodiments thereof.

The present invention is directed, in one embodiment, to a system for optimizing the continuous monitoring of targets by a collection of mobile sensor platforms comprising a plurality of mobile sensor platforms equipped with a processor, at least one imaging device and a communication device, wherein in the processor of each of the mobile sensor platforms is configured, though code executing therein, to communicate with the other plurality of mobile sensor platforms in order to assign each member of the plurality to obtain image data of a member of a set of targets in response to the receipt of target selection data, and a remote computing device configured to receive imaging data from one or more of the plurality of the mobile sensors and generate a target selection data for transmission to the plurality of mobile sensor platforms.

BRIEF DESCRIPTION OF THE DRAWINGS

The foregoing and other features of the present invention will be more readily apparent from the following detailed description and drawings of one or more exemplary embodiments of the invention in which.

DESCRIPTION OF ILLUSTRATIVE EMBODIMENTS OF THE INVENTION

By way of overview and introduction, the present invention concerns a system and method for accessing, transforming and utilizing spatial and non-spatial data related to sensors and other data generation devices to update target and navigational estimates and controls for one or more UAVs during flight or operation.

Mobile Sensor System Overview

Figure 1:
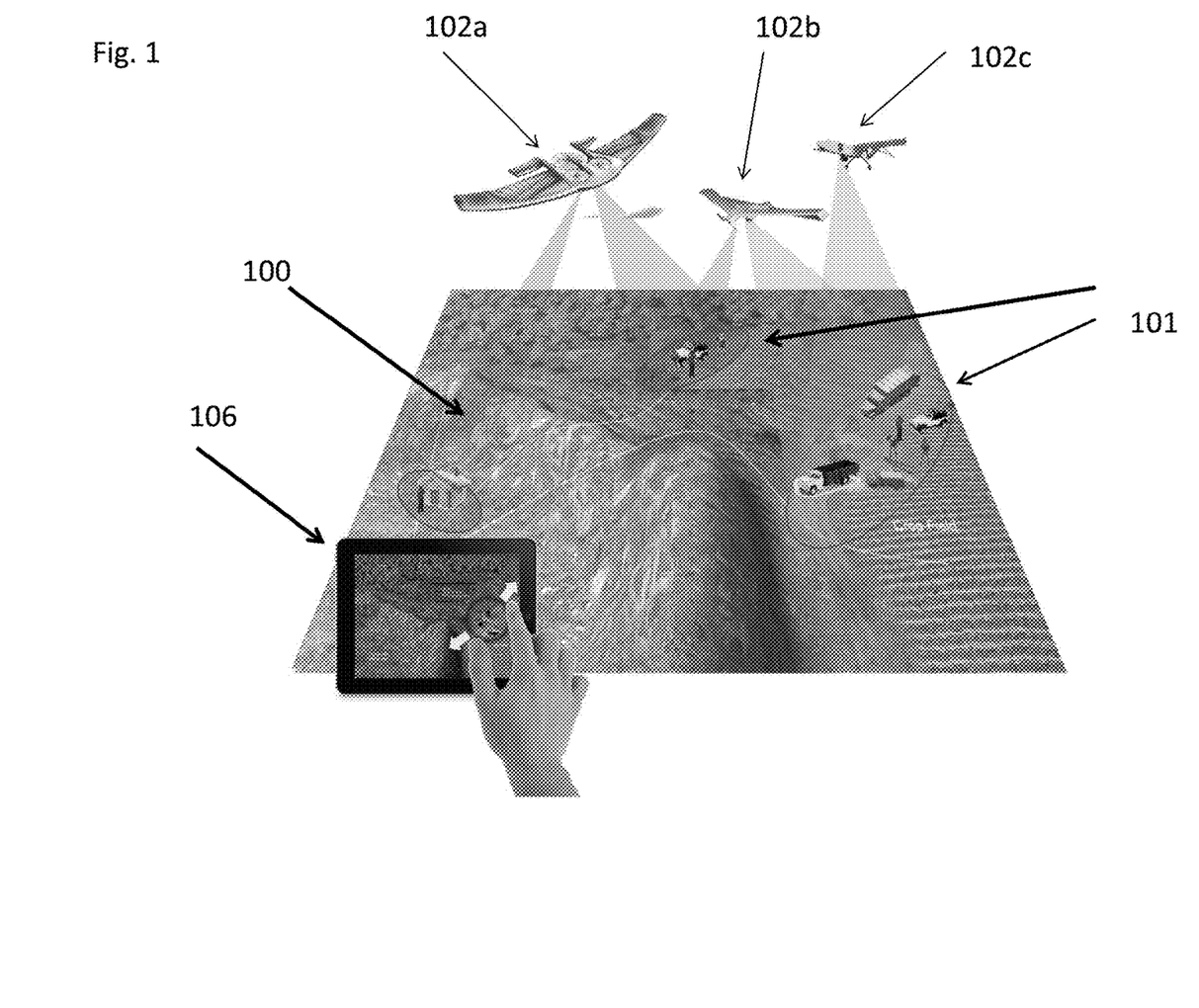
FIG. 1 is an overview of the integrated sensor collaboration system in accordance with one embodiment of the invention.

With reference to FIG. 1, the system of the present invention includes a plurality of mobile sensor platforms. In the context of FIG. 1, the mobile sensor platforms are unmanned, autonomous or semi-autonomous vehicles 102a-c (UAVs) which have been deployed to observe a given area 100. In a particular embodiment, the UAVs are fixed wing aircraft. In an alternative configuration, the UAVs are rotor aircraft. In yet a further alternative, the plurality of UAVs includes fixed wing, rotor, hybrid, heavy-than-air, lighter-than-air and unpowered aircraft. FIG. 1 illustrates a scenario where multiple sensor equipped UAVs are used to track multiple ground moving targets (elements of interest). However, those possessing an ordinary level of skill in the art will appreciate that other types of vehicles, including surface and subsurface vehicles (such as, but not limited to submarines, boats or autonomous ground vehicles) and can function as mobile sensor platforms in according with the teaching described.

In one arrangement, the UAVs are autonomous aircraft having internal computers or processors configured to augment control surfaces integral to the UAV for the purposes of controlling flight plans, paths and direction. In one configuration, the UAV possesses one or more single or multi-core processors, RAM, ROM, storage, input and output interfaces, control devices, network interfaces and integrated bus architecture suitable to receiving, routing and distributing instructions, data or code received or generated by the computer. The computer or processor of the UAV incorporates a variety of modules configured to execute and implement specific tasks related to the operational requirements of the UAV.

Figure 2:
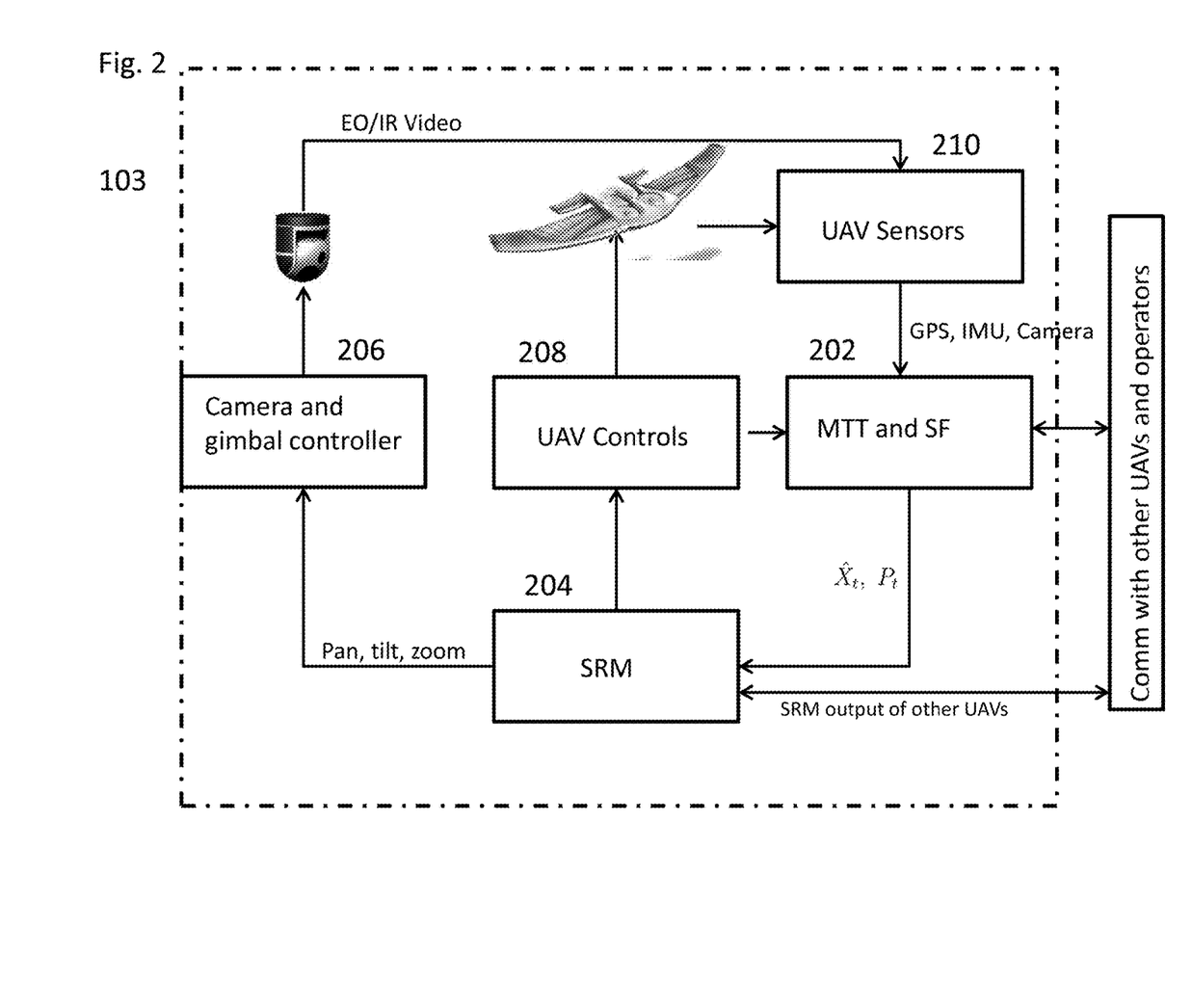
FIG. 2 is a flow diagram detailing the steps of an embodiment of the method as described herein.

For example, with reference to FIG. 2, each of the UAVs includes a processor 103 that implements a number of modules. In one non-limiting example the UAV utilizes one or more control modules 208 to enable fly-by-wire, or other control schema that allow for rudders, engines, vents, flaps, ailerons, and other control surfaces and directional control devices to be operated or activated in response to instructions sent by the internal or external computer or processor (s). The control module 208 cooperates with the navigational sensors 210, such as GPS transceivers, altimeters, or navigational cameras to determine adherence to a flight plan or to path find to a specific destination. According to an embodiment of the present system, each UAVs is equipped to track and identify elements of interest 101. For example, the processor 103 of the UAV 102 is configured to identify likely congregation locations, intersections, suspicious activity, trespassers, incursions or other such activity that would warrant additional security and surveillance using a multiple target tracking module (MTT) 202.

The MTT(s) 202 are configured as code or hardware that allows for the identification and tracking of multiple persons, places or objects within the area as identified by imaging devices integral to the sensor platform. For example, the MTT supplies instructions and processes data to implement predetermined rules or look-ups that identify a specific target or element of interest for additional scrutiny. In one arrangement, the MTT configures the processor to identify an object by comparing images of the object to data stored in local or networked databases of vehicle types, facial recognition databases, insignias, emblems or other indicia of origin.

In a particular implementation, a sensor resource management (SRM) module 204 is used to generate an imaging plan for the targets identified by the MTT module. For example, the SRM 204 generates a series of instructions to pan, zoom, or tilt a sensor or sensor platform to allow for continued tracking or imaging of a target of interest identified by the MTT module.

Each UAV is equipped with one or more sensor devices configured to record image or video data of an area under observation and store that information in a local storage device or transmit that data and information to a remote receiver. In one arrangement the sensor devices are electro-optical imaging devices. In an alternative configuration, the sensor devices are infrared imaging devices. In a particular configuration of the present invention, the sensor devices are affixed or mounted to independent or semi-independent control surfaces. For example, an electro-optical imaging device is mounted on a gimbal, or other frame, that allows for multiple degrees of movement such that the sensor device can pan, tilt and zoom on a particular item of interest regardless of the direction or orientation of the platform. In one particular arrangement the frame or gimbal is controlled by a servo motor, or other electrically or pneumatically controlled device 206.

Additionally, the UAVs are equipped to engage bidirectional transmissions of the data, such as targets identified by the MTT module 202 and the sensor control instructions generated by the sensor control instructions (SRM) 204 to third parties such as the user of the secondary computing device.

As shown in FIG. 1, a secondary computing device 106, such as a tablet or mobile computer, is configured to receive the data from the UAV(s), as well as indications about the elements identified by the UAV(s) as being of initial interest. In one arrangement, the secondary computer 106 is a custom designed computer configured to interface with one or more UAVs directly, or via a connection to a centralized or distributed network. Alternatively, the secondary computing device 106 is commercially available tablet or mobile computer implementing Windows, IOS, OS, Android, Chrome, Linux, or another common or custom operating system. Under this configuration, the tablet or mobile computer 106 is configured to execute a control program that enables communication and exchange of data between the UAV and the secondary computing device 106.

The secondary computing device 106 is configured to receive and display images and video obtained by the UAVs of elements of interest identified by the UAV. Furthermore, using code executing therein, the user of the computing is enabled to select elements for further scrutiny. In one arrangement, the selection process entails drawing or taping on a touch screen to identify specific areas for increased scrutiny. Alternatively, the user can draw paths or indicate specific geologic or landscape features that should be monitored continuously.

Using code executing in the secondary computing device 106, the user corrects or indicates a preferred target of interest for further scrutiny by the UAV(s). The user ranks or orders the elements of interest such that a priority list or ranking of elements in the area is generated or updated for the UAV(s). The updated information is transmitted back to one or more UAVs that are cooperating or accessible by the user, or agents of the user.

Upon transmission of the updated information to one or more UAVs, the plurality of UAVs cooperate with one another to determine the optimal distribution of sensor platforms (e.g. UAVs) to allow the maximum number of selected or indicated elements of interest be continuously monitored by the UAVs.

For example, based on the selected elements of interest, as well as potential obstacles or obscuring agents in the area (e.g. confusers), and hypothesis tree status (uncertainties, ambiguities), the UAVs collectively implement, or access, a cooperative sensor resource management module (CSRM) that configures the processors of the UAVs, or a remote processor capable of sending instructions to the UAVs in order to instruct the SRM 204 to generate sensor pan/tilt/zoom and UAV control module to generate a path configured to optimize tracking performance metrics (i.e. number of high priority targets tracked, estimation errors, etc.). The CSRM module will balance the expected payoff of alternative viewing and trajectory options against the costs due to sensor slewing, settling and collection time and task the sensor to optimize tracking performance. As a result cooperative multi targeting permits tracking the maximum number of elements of interest consistent with the capabilities of the sensor and the behavior of the targets.

System Integration and Cooperation

Figure 3:
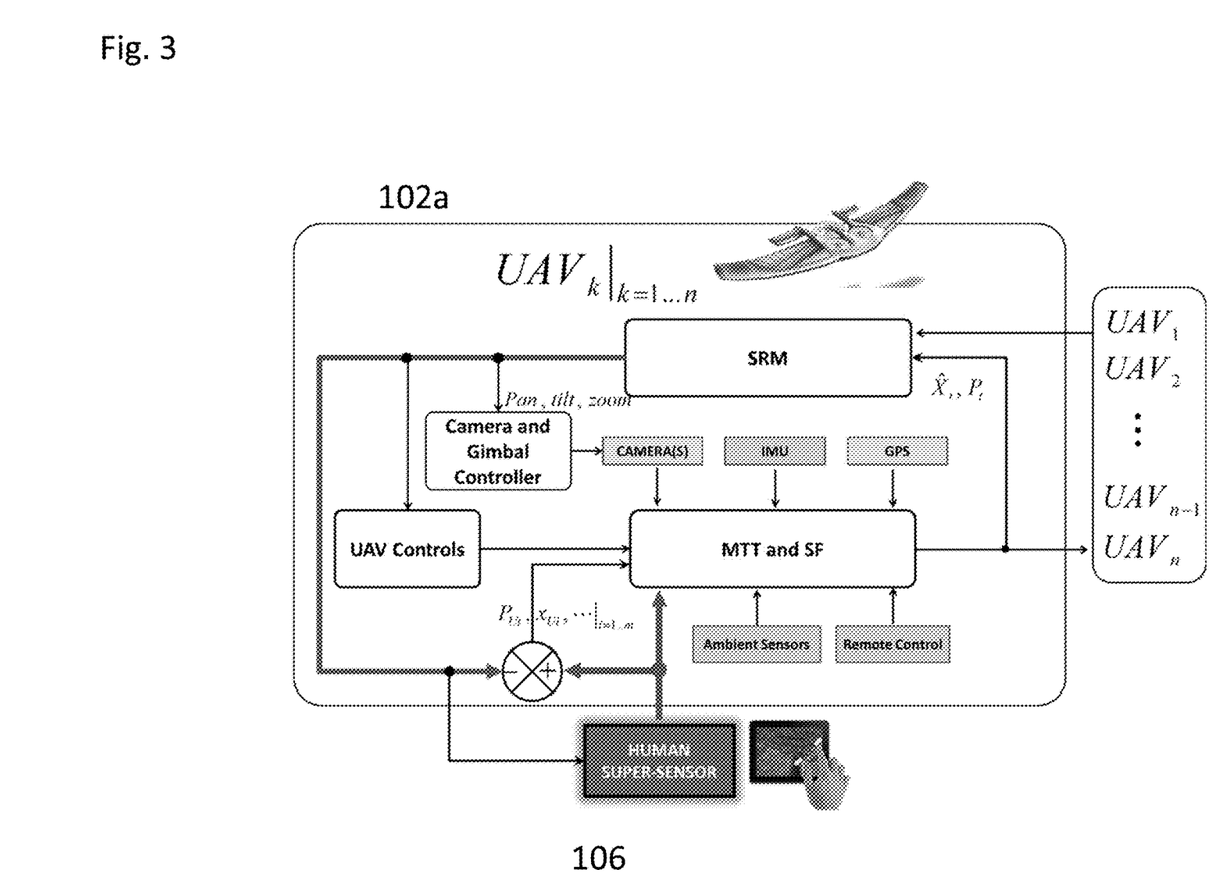
FIG. 3 is a block diagram of an example system in accordance with an embodiment of the present invention.

Turning to FIGS. 2 and 3, the CSRM module utilizes the individual control, sensor, tracking and communication modules of each UAV to implement the cooperative decision making among the UAVs to maximize element tracking and acquisition. As shown in FIG. 3 the several functions of the UAV are depicted as modules, either hardware or software. The MTT and SRM modules are configured to communicate data with other UAVs in response to receiving information from the secondary computer. The CSRM module, in one arrangement, is a stochastic scheduling (or cooperative multi-armed bandit) algorithm implemented by the processor and utilized to develop approximate solutions based on stochastic dynamic programming paradigm. For example, the processor 103 is configured to implement a Gittins index rule to send instructions to the SRM module to pan, tilt, zoom the sensor and model predictive control to control the sensor platform.

In one arrangement of the CSRM implementation, each UAV is restricted to tracking one element of interest at any given instant. Thus, all of the UAVs have to schedule and coordinate the target that each individual UAV is imaging at any given moment with all of the other UAVs present in the area. Through this cooperation, the maximum number of elements of interest can be imaged by the UAVs in the area.

In a further configuration, each UAV is equipped with a CSRM implementation module configured to communicate with a central scheduling UAV or processor that is either remote to the UAVs or is configured to execute in the processor of each UAV, or some combination thereof. For example, and with reference FIG. 3, the CSRM module configures the processor of one or more UAVs to implement the update step in an extended Kalman filter (EKF) such as.

$$P(k+1)^{-1} = \overline{P}^{-1}(k+1) + \sum_{j=1}^{n_u} \sum_{i=1}^{n_t} a_{ji} H_{ij}^T(k+1) R_{ij}^{-1} H_{ij}(k+1)$$

-continued $$a_{ij}, i \in [i, n_t], j \in [i, n_u] \text{ maximize } \prod_{i=1}^{n_t} \det\left(\overline{P}_i^{-1} + \sum_{j=1}^{n_u} a_{ij} H_{ij}^T R^{-1} H_{ij}\right)$$

$$a_{ij} \in \{0, 1\}, i \in [1, n_t], j \in [1, n_u]$$

subject to $$\sum_{i=1}^{n_t} a_{ij} = 1.$$

where P(k+1) is the joint covariance matrix of associated to all of the target states, $\overline{P}$(k+1) is the predicted covariance matrix, $H_{ij}$(k+1) is the measurement jacobian of $j^{th}$ target sensed from $i^{th}$ UAV. Similarly, $a_{ij}$ is the scalar weight which is 1 if $j^{th}$ target is in the field-of-view of the $i^{th}$ UAV. Both $H_{ij}$(k+1) and $a_{ij}$ are function of UAVs position, attitude, gimbal angles, and sensor field-of-view. In a further implementation, to compensate for unknown target behavior a model predictive control (MPC) is used to plan paths of UAVs and orientation of the sensor over a finite horizon to maximize the information and improve the accuracy of the state estimates of all of the targets.

Here, the secondary device user provides information/situational awareness to the UAV in the form of selections of elements of interest. The information provided by the user and 'command central' (provided in more detail in FIG. 4), is updated to the UAV and integrated with the multiple tracking modules (MTT) and sensor resource modules, thereby incorporating the new information into controlling the sensor movement mechanism (e.g. gimbal movement mechanism) targeting and/or UAV path planning and control algorithms.

In one particular implementation shown in FIG. 3, upon receiving data from the secondary computing device and coordination data from the other UAVs the processor, of each UAV processor utilizes the SRM module 206 to adjust the field of view by sending instructions to the gimbal and camera controller to maintain imaging of the elements of interest. Additionally, the SRM 204 sends instructions to the control devices of the UAV, such as through a control interface 208 to instruct the UAV to maintain the element of interest in the field of view. As such, depending on the nature of the element of interest, the UAV controls 208 will change the flight direction, altitude, orientation or other characteristic of the UAV to allow it to track the assigned element(s) of interest. In a further arrangement, SRM module configures the processor to manage the information collection necessary to support kinematic tracking, multi-target track association, confirmatory ID, context scene modeling, and collateral damage avoidance.

Figure 4:
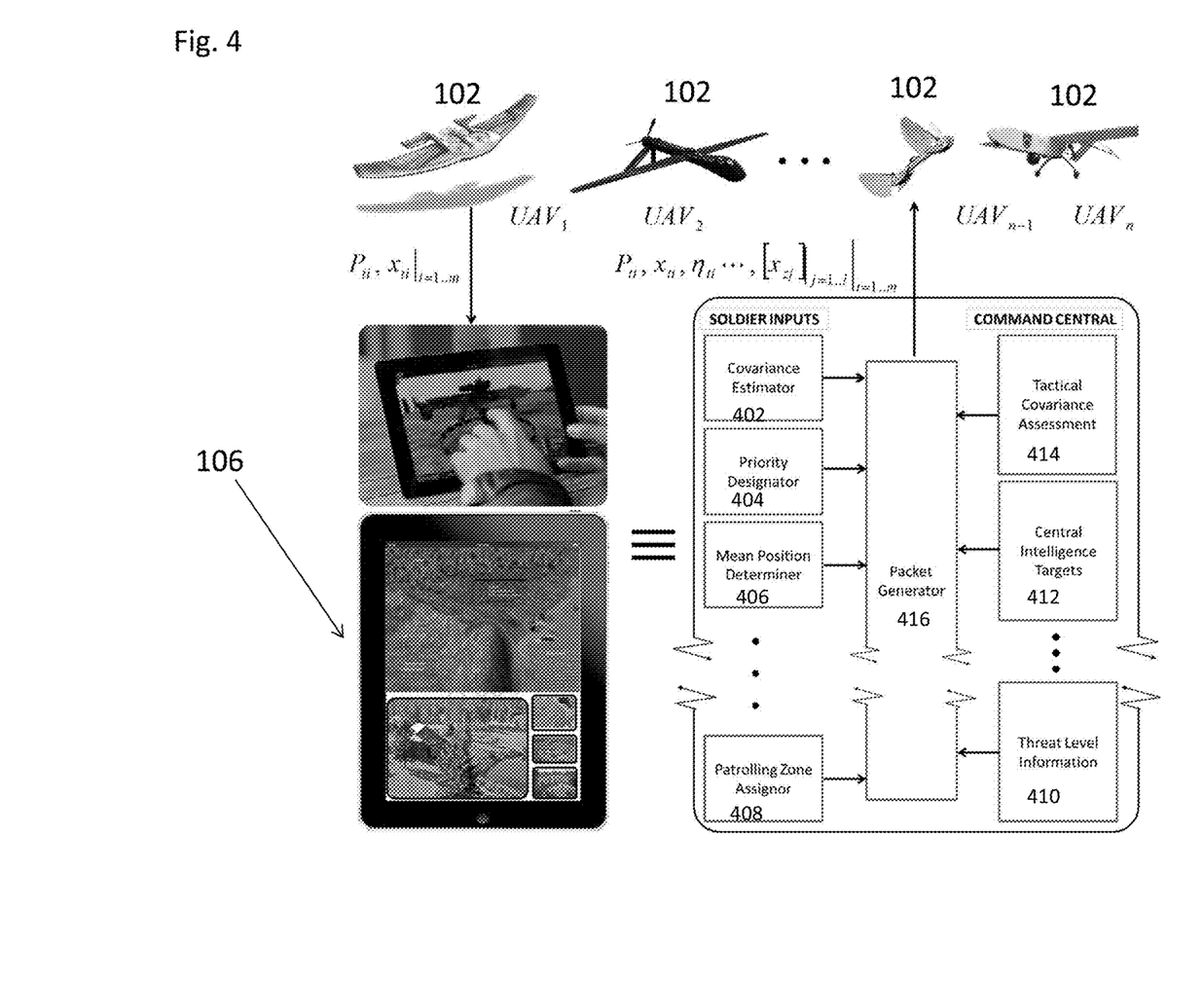
FIG. 4 is a flow diagram detailing the additional steps of an embodiment of the system as described herein.

In an additional implementation the system described, more than one data input or stream is used by the UAVs to implement the CSRM module. Turning to FIG. 4, the imaging data obtained by a single or multiple UAVs (102) are transmitted to the secondary computing device 106. Here, command data, in addition to the data selected by the user of the secondary device, is used to select or otherwise provide priority information for the elements of interest. In a non-limiting example, the user of the secondary device is a soldier that selects or provides inputs to various modules such as a covariance estimator 402, priority designators 404, mean position determiners 406 and patrolling assigners 408.

Aadditional or alternative modules that are accessible or usable by the soldier in this example are envisioned and understood. These soldier inputs are then combined with inputs that originate with additional users, such a command or control user in a remote location. Here, the soldier data is combined with tactical 414, intelligence 412 and threat level assessment 410 data that originates from additional users. All of the data is combined in to a packet generator 416 implemented as code executing in a processor, either integral to the secondary computer device or as a remote processor that is configured to send information to the plurality of UAVs. Each of the UAV(s) receives the updated information and implements the CSRM module to determine how to allocate the tasks of maintaining observation of the items specified or of interest.

While the invention has been particularly shown and described with reference to a preferred embodiment thereof, it will be understood by those skilled in the art that various changes in form and details may be made therein without departing from the spirit and scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Particular embodiments of the subject matter of the present invention have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

The above description of embodiments not intended to be exhaustive or to limit the systems and methods described to the precise form disclosed. While specific embodiments of, and examples for, the system and method are described herein for illustrative purposes, various equivalent modifications are possible within the scope of care coordination plan generation methods, as those skilled in the relevant art will recognize. Furthermore, the specific teachings of the care plan management system and methods provided herein can be applied to other health care management systems and methods, not only for the specific examples described above.

The elements and acts of the various embodiments described above can be combined to provide further embodiments. These and other changes can be made to the apparatus and methods in light of the above detailed description.

A method for maximizing the number of targets for monitoring by a plurality of mobile sensor platforms distributed throughout an area, the method comprising:

obtaining imaging data, using at least one sensor integral to at least one of the plurality of mobile sensor platforms, each mobile sensor platform having code executed in a processor therein, of a plurality of targets of interest within a defined geographic region;

transmitting to a second computer the imaging data of the targets of interest obtained by at least one of the mobile sensor platforms;

selecting, using the second computer, a subset of the targets of interest for additional imaging;

transmitting the selection of a subset of targets of interest to a least one of the plurality of mobile sensor platforms;

assigning, using code executing in the processor of at least one of the plurality of mobile sensor platforms, each of the plurality of mobile sensor platforms to continuously image a specific member of the subset of targets such that the maximum number of targets is continuously imaged;

updating, using code executing in the processor at least one of the plurality of mobile sensor platforms, an assigned target for each of the plurality of mobile sensor platforms such that each mobile platform maintains continuous imaging of the respective assigned target; and altering, using code executing in the processor of each of the plurality of mobile sensor platforms, at least one sensor control device integral to the mobile sensor platform to maintain continuous imaging of the respective assigned target.

What is claimed is:

1. A method for maximizing the number of targets for monitoring by a plurality of mobile sensor platforms distributed throughout an area, the method comprising:

obtaining imaging data, using at least one sensor integral to at least one of the plurality of mobile sensor platforms, each mobile sensor platform having code executed in a processor therein, of a plurality of targets of interest within a defined geographic region;

transmitting to a second computer the imaging data of the targets of interest obtained by at least one of the mobile sensor platforms;

selecting, using the second computer, a subset of the targets of interest for additional imaging;

transmitting the selection of a subset of targets of interest to a least one of the plurality of mobile sensor platforms;

assigning, using code executing in the processor of at least one of the plurality of mobile sensor platforms, each of the plurality of mobile sensor platforms to continuously image a specific member of the subset of targets such that the maximum number of targets is continuously imaged;

updating, using code executing in the processor at least one of the plurality of mobile sensor platforms, an assigned target for each of the plurality of mobile sensor platforms such that each mobile platform maintains continuous imaging of the respective assigned target; and altering, using code executing in the processor of each of the plurality of mobile sensor platforms, at least one sensor control device integral to the mobile sensor platform to maintain continuous imaging of the respective assigned target.

2. The method of claim 1, wherein the mobile sensor platform is an aerial vehicle.

3. The method of claim 1, wherein the aerial vehicle is an unmanned autonomous vehicle.

4. The method of claim 2, further comprising:
adjusting a pre-set navigational path in response to the updating the assigned target.

5. The method of claim 4, wherein the assigning of each mobile sensor platform to continuously monitor a specific member of the subset of targets implementing an update step in an extended Kalman filter (EKF) such that:

$$P(k+1)^{-1} = \overline{P}^{-1}(k+1) + \sum_{j=1}^{n_u} \sum_{i=1}^{n_t} a_{ji} H_{ij}^T(k+1) R_{ij}^{-1} H_{ij}(k+1)$$

$$a_{ij}, i \in [i, n_t], j \in [i, n_u] \text{ maximize } \prod_{i=1}^{n_t} \det\left(\overline{P}_i^{-1} + \sum_{j=1}^{n_u} a_{ij} H_{ij}^T R^{-1} H_{ij}\right)$$

$$a_{ij} \in \{0, 1\}, i \in [1, n_t], j \in [1, n_u]$$

subject to $\sum_{i=1}^{n_t} a_{ij} = 1;$ where P(k+1) is the joint covariance matrix of associated to all of the target states, P(k+1) is the predicted covariance matrix, H_ij (k+1) is the measurement jacobian of j^th target sensed from i^th UAV; Similarly, a_ij is the scalar weight which is 1 if j^th target is in the field-of-view of the i^th UAV; Both H_ij (k+1) and a_ij are function of UAVs position, attitude, gimbal angles, and sensor field-of-view.

6. A system for optimizing the continuous monitoring of targets by a collection of mobile sensor platforms comprising:

a plurality of mobile sensor platforms equipped with a processor, at least one imaging device and a communication device, wherein in the processor of each of the mobile sensor platforms is configured, though code executing therein, to communicate with the other plurality of mobile sensor platforms in order to assign each member of the plurality to obtain image data of a member of a set of targets in response to the receipt of target selection data and further configured such that least one sensor control device integral to the mobile sensor platform is able to maintain continuous imaging of the respective assigned member of the set of targets;

a first remote computing device configured to receive imaging data from one or more of the plurality of the mobile sensors and generate a target selection data for transmission to the plurality of mobile sensor platforms, the remote computing device further configured to transmit the imaging data of the targets of interest obtained by at least one of the mobile sensor platforms; and a second remote computing device, configured to:
receive imaging data of the targets of interest;
determine a selection of a subset of the targets of interest for additional imaging; and transmit the selected subset of targets of interest to a least one of the plurality of mobile sensor platforms.

7. The system of claim 6, wherein the mobile sensor platforms are aerial vehicles.

8. The system of claim 6, further comprising a secondary remote computing device configured to provide additional input relating to the target selection data.

* * * * *